United States Patent [19]

Morrow Et al.

[11] Patent Number: 5,453,225
[45] Date of Patent: Sep. 26, 1995

[54] METHOD OF MAKING A COMPOSITE REFRACTORY MATERIAL

[75] Inventor: Marvin S. Morrow, Kingston, Cressie E. Holcombe, Knoxville, both of Tenn.

[73] Assignee: Martin Marietta Energy Systems, Inc., Oak Ridge, Tenn.

[21] Appl. No.: 218,400

[22] Filed: Mar. 28, 1994

Related U.S. Application Data

[62] Division of Ser. No. 7,441, Jan. 22, 1993, Pat. No. 5,330,942.

[51] Int. Cl.$^6$ ................................................ B29C 71/04
[52] U.S. Cl. ..................................... 264/432; 264/434
[58] Field of Search .................................... 264/25, 26

[56] References Cited

U.S. PATENT DOCUMENTS 5,164,130  11/1992  Holcombe et al. ................. 264/26
5,321,223   6/1994  Kimrey, Jr. et al. ................ 264/26

*Primary Examiner*—Christopher A. Fiorilla
*Attorney, Agent, or Firm*—Ivan L. Ericson; Harold W. Adams

[57] ABSTRACT

A composite refractory material is prepared by combining boron carbide with furan resin to form a mixture containing about 8 wt. % furan resin. The mixture is formed into a pellet which is placed into a grit pack comprising an oxide of an element such as yttrium to form a sinterable body. The sinterable body is sintered under vacuum with microwave energy at a temperature no greater than 2000° C. to form a composite refractory material.

3 Claims, No Drawings

METHOD OF MAKING A COMPOSITE REFRACTORY MATERIAL

This invention was made with Government support under contract DE-AC05-84OR21400 awarded by the U.S. Department of Energy to Martin Marietta Energy Systems, Inc. and the Government has certain rights in this Invention.

This application is a division of application No. 08/007,441, filed Jan. 22, 1993, now U.S. Pat. No. 5,330,942.

FIELD OF THE INVENTION

The present invention relates to a refractory material composition, more particularly, to a refractory material composition having a boron carbide matrix.

BACKGROUND OF THE INVENTION

There has been a continual need for sintering nonoxide ceramics efficiently, particularly those that are suitable for high-hardness and high-temperature applications, such as are required for drill and tool bits and for ceramic armor. Boron carbide is an excellent lightweight material for ceramic armor and high-wear applications. However, the material does not sinter well, requiring temperatures over 2200° C. for densification with or without hot-pressing. Microwave sintering has been attempted with boron carbide with requirements still of temperatures about 2100° C. for densification. This development has shown that densification can result below 2000° C. with a new material that should be useful in all the typical areas of boron carbide usage.

OBJECTS OF THE INVENTION

Accordingly, it is an object of the present invention to provide a new and improved refractory material composition having a boron carbide matrix.

Further and other objects of the present invention will become apparent from the description contained herein.

SUMMARY OF THE INVENTION

In accordance with one aspect of the present invention, a new and improved composite refractory material composition comprises a boron carbide matrix and minor constituents of yttrium-boron-oxygen-carbon phases uniformly distributed throughout the boron carbide matrix.

In accordance with another aspect of the present invention, a new and improved composite refractory material composition comprises a matrix of $B_4C$ and minor constituents of $YB_4$ and $YB_2C_2$ phases.

DETAILED DESCRIPTION OF THE PREFERRED EMBODIMENTS

It was discovered that when boron carbide −2.5 wt. % carbon (with the carbon being derived from 8 wt. % furan resin "Varcum" (a trademark of Occidental Chemical Corp., Durez Div.) pellets are microwave sintered in vacuum in a yttria grit pack, using roughing or high-vacuum conditions, fully dense pellets result with the sintering temperature below 2000° C. To compare the properties of such material, indentation fracture toughness was used (Average of 6 indents; Young's Modulus of 361 GPa was used; indentation load was 6.8 kg; method of A. G. Evans, ASTM STP 678):

| | Microwaved Material (1.3 Pa or 10–2 Torr) (84 min., 1900–1975° C.) | Hot-Pressed Material (1900° C., 90 min; vacuum level of $1.3 \times 10^{-2} - 1.3 \times 10^{-3}$ Pa; applied pressure 27.6 MPa at start to 68.9 MPa at 1900° C.) |
|---|---|---|
| Vickers Hardness (GPa) | 19.5(2.5) | 22.2(3.2) |
| KIC Fracture Toughness (MPa*m0.5) | 3.9(0.4) | 2.4(0.3) |
| Bulk Density* (g/cm3) | 2.62 | 2.54 |
| Real Density* (g/cm3) | 2.62 | 2.55 |
| Open Porosity* (%) | 0.08 | 0.32 |

Note:
Standard deviations are given in parentheses
*Data from mercury intrusion porosimetry These data show that the fracture toughness of the microwaved material is nearly doubled (if you use the highest value of the standard deviation for the microwaved material and the lowest value for the hot-pressed material)—a distinct improvement over normal material of the same starting composition.

An evaluation of the indents where the diamond inventor penetrated the microwaved material by scanning electron microscopy showed that the standard cracks that emanate from the pyramid were StOPPed when they contacted a yttrium containing grain—an excellent example of CRACK BLUNTING by the yttrium-containing grains.

The yttrium-containing grains were shown by scanning electron microscopy and microprobe analyses to be dispersed evenly throughout the material as 5 micron particulates, with the matrix being 40 micron boron carbon grains (large compared to the 3 micron or less starting particles). The yttrium-rich regions contain boron, carbide, oxygen, as well as yttrium. The overall yttrium content of the material was 9.4wt.%.

The microwaved sample was analyzed by X-ray diffraction and shown to contain:

Major - $B_4C$

Intermediate - $YB_4$

Minor - $YB_2C_2$ (Modified)

The modified material may contain extraneous substitution that shifts the X-ray diffraction pattern (i.e., oxygen).

The hot-pressed material contains grains equal to or less than 5 micron in size, with the grains being essentially equal-sized.

Thus, for whatever reason, the microwaving technique with vacuum allows the yttrium oxide vapor to penetrate the sintering pellet, enhancing the sintering as well as creating the new material that contains yttrium-carbon-oxygen-boron and yttrium boride. The actual density remains low, good for lightweight armor applications. The hardness is nearly the same as pure $B_4C$, but the fracture toughness is MUCH improved over normal boron carbide material. This is VERY important in armor applications as well as for tool bits. The yttria grit pack used to create the new material is essentially standard for heating boron carbide easily in microwave environments (i.e., −14, +100 Mesh size or 150 to 1400 microns size). The pellets tested so far have been densified similarly whether or not they were covered with a flexible graphite foil "Grafoil" (A Union Carbide Corporation trademark of an unusual material produced by Union Carbide Corporation which is similar to pyrolytic graphite in foil form) covering - probably because of the vacuum allowing easier penetration of the yttria vapor into the boron carbide.

Why does vacuum seem essential to creating this material? The material does not ordinarily occur in argon/inert atmosphere microwaving - probably because of the higher temperatures needed to get adequate diffusion. In any case, temperatures of 2150°–2250° C. are needed when utilizing argon/inert atmospheres to get adequate densification with boron carbide (with, of course, the 2.5 wt.% carbon addition needed for pressureless sintering). These high temperatures lead to liquid formation if the pellets are uncovered (i.e., not protected with Grafoil or coatings): the pellets have regions that are totally melted away - believed to be from high yttrium contamination.

Since vacuum sintering allows densification to proceed at temperatures below 2000° C., and since vacuum promotes yttrium oxide vapor penetration of the sintering pellet, it is believed that the new material forms. Thus, the yttrium-boron-oxygen-carbon phases distribute uniformly throughout a boron carbide matrix, yielding a fully dense or nearly-fully-dense pellet. There are no references to a composite material utilizing a major percentage of boron carbide along with yttrium-boron-oxygen-carbon constituency in order to create a new material. Likewise, no reference to achieving a high fracture toughness with this phase assemblage is known. Also, no reference exists citing the use of microwaving (with the requirement of being completed in rough or high vacuum) to create the new material.

The free carbon, initially around 2.5 wt.% (from the 8 wt.% "Varcum" furan resin), may take some vital part in the creation of this composite - since the predominant phases(s) was analyzed by electron microprobe to contain yttrium-boron-carbon-oxygen. The fact that the final material is not apparently water-reactive is interesting in light of the high degree of water reactivity of yttrium carbide(s). All these observations point to the unique nature of this boron-carbide-matrix, yttrium-containing composition.

Closest prior research is the U.S. Pat. No. 4,195,066 which introduces carbon additives necessary for pressureless sintering of boron carbide; U.S. Pat. No. 4,320,204 which covers silicon carbide/aluminum composites; and U.S. Pat. No. 5,013,694 which covers a composite of titanium diboride/chromium diboride/yttria that was created by microwaving in argon a pellet of the boride mix while in a yttria grit pack.

The amount of yttrium phases that result in the final composite are expected to depend on the processing temperature. While temperatures below 2000° C. are desired for ease of processing, higher temperatures (up to the point of melting of the phases) could lead to faster processing.

However, such would not be advised due to the difficulty of handling these high temperatures and because the grit pack would react and probably not be reusable (Note the yttria grit pack can be reused when ≯2000° C. processing temperatures are used).

Other rare earth oxides could be used in place of yttria - such as an oxide of a rare earth selected from the group consisting of lanthanum, cerium, praseodymium, neodymium, samarium, europium, gadolinium, terbium, dysprosium, holmium, erbium, thulium, ytterbium, lutetium, and mixtures thereof. Each would be expected to create similar composites to yttria when microwaved appropriately.

Uses for this material would be expected to be the same as for boron carbide in general. Boron carbide has extensive applications in the machine tool area as well as for ceramic armor.

There should be considerable use in all areas using lightweight, hard, abrasive materials. The electrical conductivity of boron carbide could also allow other uses. High fracture toughness and melting above 2000° C. should allow utilization in many demanding environments. A particular problem in widespread use for ceramic armor has been the requirement of hot-pressing - a very expensive and tedious process. Microwave processing as used for this discovery allows very fast, easy densification.

The potential for general use/replacement of high purity boron carbide is very high, since the true density is close to the pure boron carbide and the critical fracture toughness is MUCH improved over the pure material.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of preparing a composite refractory material comprising:

combining boron carbide with furan resin to form a mixture;

forming said mixture into a pellet;

placing said pellet in a rare earth oxide grit pack;

sintering said pellet under vacuum with microwave energy at a temperature not exceeding 2000° C. to form a composite refractory material comprising a boron carbide matrix with other phases distributed throughout.

2. A method as defined in claim 1 wherein said grit pack comprises an oxide of an element selected from the group consisting of yttrium, lanthanum, cerium, praseodymium, neodymium, samarium, europium, gadolinium, terbium, dysprosium, holmium, erbium, thulium, ytterbium, lutetium, and mixtures thereof.

3. A method as defined in claim 1 wherein said mixture contains about 8 wt. % furan resin.

* * * * *